United States Patent
Willems et al.

(10) Patent No.: US 11,534,882 B2
(45) Date of Patent: Dec. 27, 2022

(54) METHOD FOR SHARPENING KNIVES OF AN AGRICULTURAL VEHICLE

(71) Applicant: CNH Industrial America LLC, New Holland, PA (US)

(72) Inventors: Pieter Willems, Maldegem (BE); Dries Delie, Poelkapelle (BE); Stijn Van Belleghem, Maldegem (BE)

(73) Assignee: CNH Industrial America LLC, New Holland, PA (US)

( * ) Notice: Subject to any disclaimer, the term of this patent is extended or adjusted under 35 U.S.C. 154(b) by 463 days.

(21) Appl. No.: 16/613,019

(22) PCT Filed: May 12, 2018

(86) PCT No.: PCT/EP2018/062278
§ 371 (c)(1),
(2) Date: Nov. 12, 2019

(87) PCT Pub. No.: WO2018/206809
PCT Pub. Date: Nov. 15, 2018

(65) Prior Publication Data
US 2021/0078128 A1 Mar. 18, 2021

(30) Foreign Application Priority Data
May 12, 2017 (BE) .................. 2017/5356

(51) Int. Cl.
*B24B 3/36* (2006.01)
*A01D 43/08* (2006.01)
(52) U.S. Cl.
CPC ............ *B24B 3/363* (2013.01); *A01D 43/086* (2013.01)

(58) Field of Classification Search
CPC ......... B24B 15/00; B24B 3/363; B24B 3/365; B24B 3/55; B24B 3/46; A01D 75/08
(Continued)

(56) References Cited

U.S. PATENT DOCUMENTS

| 4,640,059 A | * | 2/1987 | Komossa | ................ A24B 7/12 |
| | | | | 451/421 |
| 4,746,074 A | * | 5/1988 | Wistuba | ................ A01F 29/22 |
| | | | | 451/421 |

(Continued)

FOREIGN PATENT DOCUMENTS

EP 1972191 A1 9/2008

OTHER PUBLICATIONS

International Search Report and Written Opinion for PCT Application No. PCT/EP2018/062278 dated Jul. 10, 2018 (13 pages).

*Primary Examiner* — Giovanni Astacio-Oquendo
(74) *Attorney, Agent, or Firm* — Peter Zacharias; Patrick Sheldrake

(57) ABSTRACT

A method for sharpening cutting knives carried by a cutter drum in a housing of an agricultural vehicle includes: rotating the cutter drum while keeping a sharpening door closed so an overpressure is created inside the housing, the sharpening door shielding a sharpening stone from the cutting knives while creating the overpressure; opening a transition door of the housing below the cutter drum to eject crop material through the open transition door; opening the sharpening door to expose the cutting knives to the sharpening stone and closing the transition door; grinding one or more of the cutting knives with the exposed sharpening stone; and closing the sharpening door to shield the sharpening stone from the cutting knives after grinding.

12 Claims, 6 Drawing Sheets

(58) Field of Classification Search
USPC ......... 324/71.1, 76.19, 76.33, 77.11; 56/250; 451/45
See application file for complete search history.

(56) References Cited

U.S. PATENT DOCUMENTS

| | | | |
|---|---|---|---|
| 5,209,025 | A | 5/1993 | Martin et al. |
| 6,430,909 | B1 * | 8/2002 | Clauss .................... A01F 29/22 56/250 |
| 2005/0076631 | A1 | 4/2005 | Wolf et al. |
| 2008/0234020 | A1 | 9/2008 | Isfort |
| 2018/0215004 | A1 * | 8/2018 | Cornwell ................ B24B 3/366 |
| 2018/0288942 | A1 * | 10/2018 | Dreier ...................... B24B 3/58 |
| 2020/0107503 | A1 * | 4/2020 | Bernard ................ A01K 5/001 |

* cited by examiner

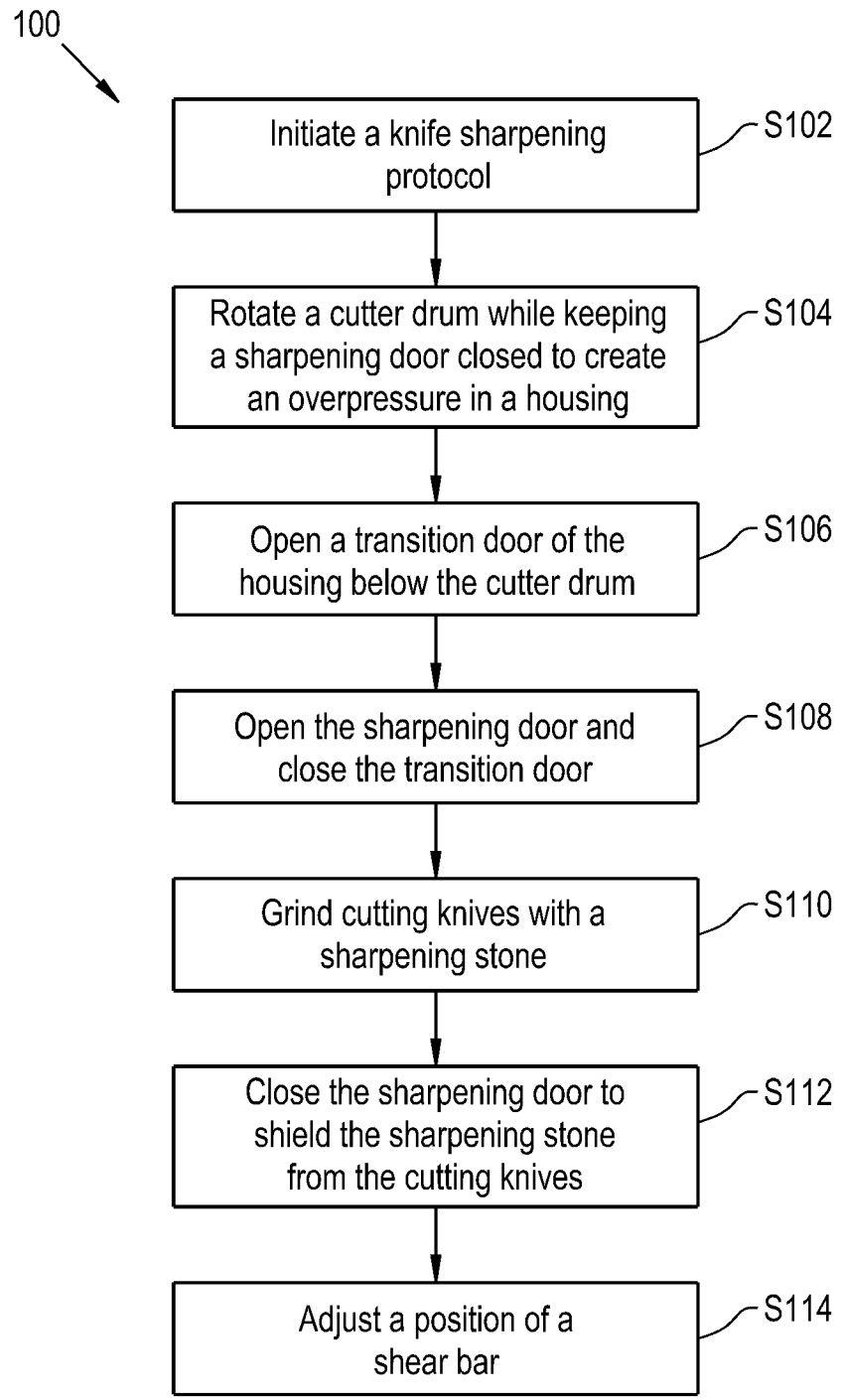

METHOD FOR SHARPENING KNIVES OF AN AGRICULTURAL VEHICLE

BACKGROUND OF THE INVENTION

The present invention relates to agricultural vehicles and, more specifically, to agricultural vehicles with knives and associated knife sharpening systems.

Agricultural vehicles, such as forage harvesters, can sometimes be equipped with rotating knives to chop crop material from a field. In the case of forage harvesters, feed rolls generally rotate to direct crop material toward the rotating knives, which are rotated by a cutter drum. The rotating knives act in concert with a stationary shear bar to cut the crop material directed toward the knives, with the cut crop material then proceeding toward a crop processor for further processing and/or an accelerator for ejection from the harvester.

One particular problem that occurs during the harvesting procedure is the knives tend to get dull after cutting through a large volume of crop material. Dull knives are not only more prone to further, irreversible damage, but also increase the power requirements to maintain a consistent throughput.

To address this problem, sharpening systems are known which can automatically sharpen the knives. To sharpen the knives, a door adjacent the trajectory of the cutter drum is opened and a sharpening stone, which may also be referred to as a whetstone, comes into contact with cutting edges of the knives and grinds down the edges of the knives to a sharp edge as the cutter drum rotates. Once the knives are sharpened, the sharpening stone can be parked remote of the rotational path of the knives and the sharpening door is closed so harvesting by the forage harvester can re-commence with minimal risk of stray crop material escaping from the cutter drum housing.

While the sharpening procedure is effective to sharpen the knives, the sharpening itself can cause its own associated problems. Since the knives are almost universally formed of metal and the sharpening stone grinds the metal to sharpen the edges, a great number of sparks can be formed while the sharpening stone grinds the knives. When there is crop material remaining adjacent to the grinding area, especially dry crop material, the sparks caused by the grinding can cause a thermal incident. Further, rotation of the cutter drum can create an overpressure within the harvester. When the sharpening door opens so the sharpening stone can grind down the knife edges, crop material tends to be forced by the overpressure through the sharpening door, which can cause crop material accumulation near the sharpening system capable of jamming or otherwise interfering with operation of the sharpening system.

What is needed in the art is an agricultural vehicle which is less susceptible to thermal incidents and sharpening system malfunction during a knife sharpening protocol.

SUMMARY OF THE INVENTION

The present invention provides a method for sharpening knives including a knife sharpening protocol which creates an overpressure to eject crop material through an open transition door prior to opening a sharpening door to grind the knives.

The invention in one form is directed to a method for sharpening cutting knives carried by a cutter drum in a housing of an agricultural vehicle which includes initiating a knife sharpening protocol. The knife sharpening protocol includes the following sequence of steps: rotating the cutter drum while keeping a sharpening door closed so an overpressure is created inside the housing, the sharpening door shielding a sharpening stone from the cutting knives while creating the overpressure; opening a transition door of the housing below the cutter drum to eject crop material through the open transition door; opening the sharpening door to expose the cutting knives to the sharpening stone and closing the transition door; grinding one or more of the cutting knives with the exposed sharpening stone; and closing the sharpening door to shield the sharpening stone from the cutting knives after grinding.

In one exemplary embodiment, the sharpening door is above the cutter drum. The grinding can include lowering the sharpening stone toward the cutter drum. The grinding can further include moving the sharpening stone along a travel path which is parallel to an axis of rotation of the cutter dream. Moving the sharpening stone along the travel path can occur in a series of passes, each pass being defined by the sharpening stone moving along an entirety of the travel path, the sharpening stone lowering toward the cutter drum after a predetermined number of passes. The sharpening stone can be raised outside of the housing or parked aside the housing prior to closing the sharpening door.

In yet another exemplary embodiment, the cutter drum continues rotating during grinding by the sharpening stone. Herein, the cutter drum can rotate in a direction equal to the normal cutting direction or in an opposite direction in order to minimize the consequences of a possible collision with the lowered sharpening stone.

In yet another exemplary embodiment, the method can include adjusting a position of a shear bar following the knife sharpening protocol.

In yet another exemplary embodiment, the method can include stopping rotation of at least one feed roll prior to opening the transition door.

In yet another exemplary embodiment, the present invention provides an agricultural vehicle configured to perform any of the previously described methods.

In yet another exemplary embodiment, one or more of the previously described methods can be implemented by a controller of the agricultural vehicle. The agricultural vehicle can be, for example, a forage harvester. The agricultural vehicle can also include a display operatively coupled to the controller, the knife sharpening protocol being initiated by selecting a corresponding icon on the display.

An advantage of the present invention is that the overpressure created during rotation of the cutter drum can expel crop material through the open transition door, rather than an open sharpening door, to lessen the risk of crop material accumulating in a location which can interfere with the knife sharpening protocol.

Another advantage is that the expulsion of crop material through the open transition door can reduce the risk of a thermal incident by removing potentially combustible crop material from an area where sparks are likely to occur during grinding.

Yet another advantage is that the aforementioned knife sharpening protocol can be readily implemented in a wide variety of agricultural vehicles with minimal, if any, modification of the physical components.

BRIEF DESCRIPTION OF THE DRAWINGS

The above-mentioned and other features and advantages, and the manner of attaining them, will become more apparent and the invention will be better understood by reference to the following description of exemplary embodiments of the invention taken in conjunction with the accompanying drawings, wherein:

FIG. 6 is a flow chart illustrating a method in accordance with an exemplary embodiment of the present invention.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "forward", "rearward", "left" and "right", when used in connection with the agricultural vehicle and/or components thereof are usually determined with reference to the direction of forward operative travel of the harvester, but again, they should not be construed as limiting. The terms "longitudinal" and "transverse" are determined with reference to the fore-and-aft direction of the agricultural vehicle and are equally not to be construed as limiting. The terms "up," "down," "raise," and "lower" are determined with reference to a ground plane on which the agricultural vehicle is resting and are equally not to be construed as limiting.

Figure 1:
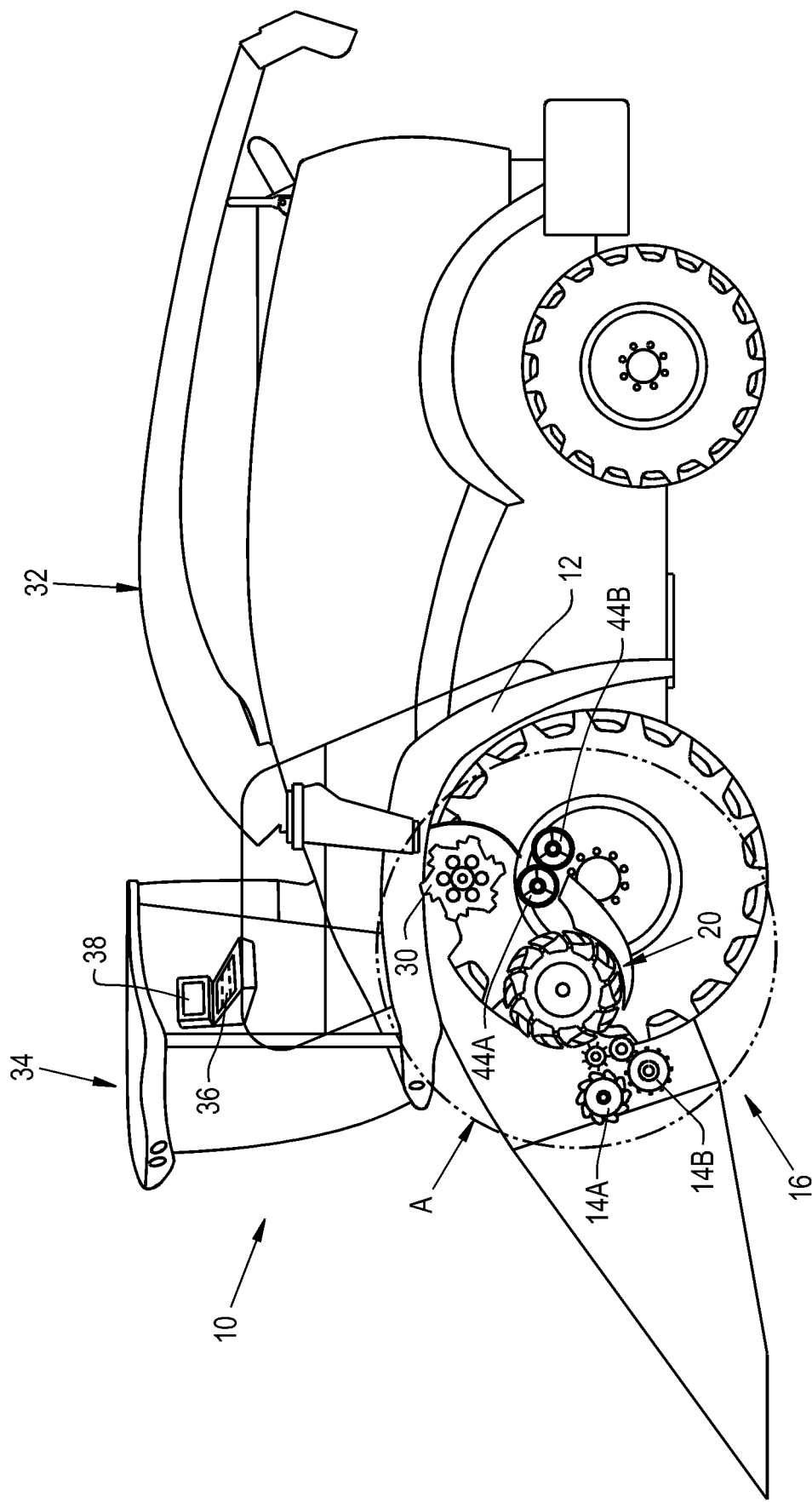
FIG. 1 is a side view of an agricultural vehicle, shown as a forage harvester, formed in accordance with an exemplary embodiment of the present invention.
Figure 2:
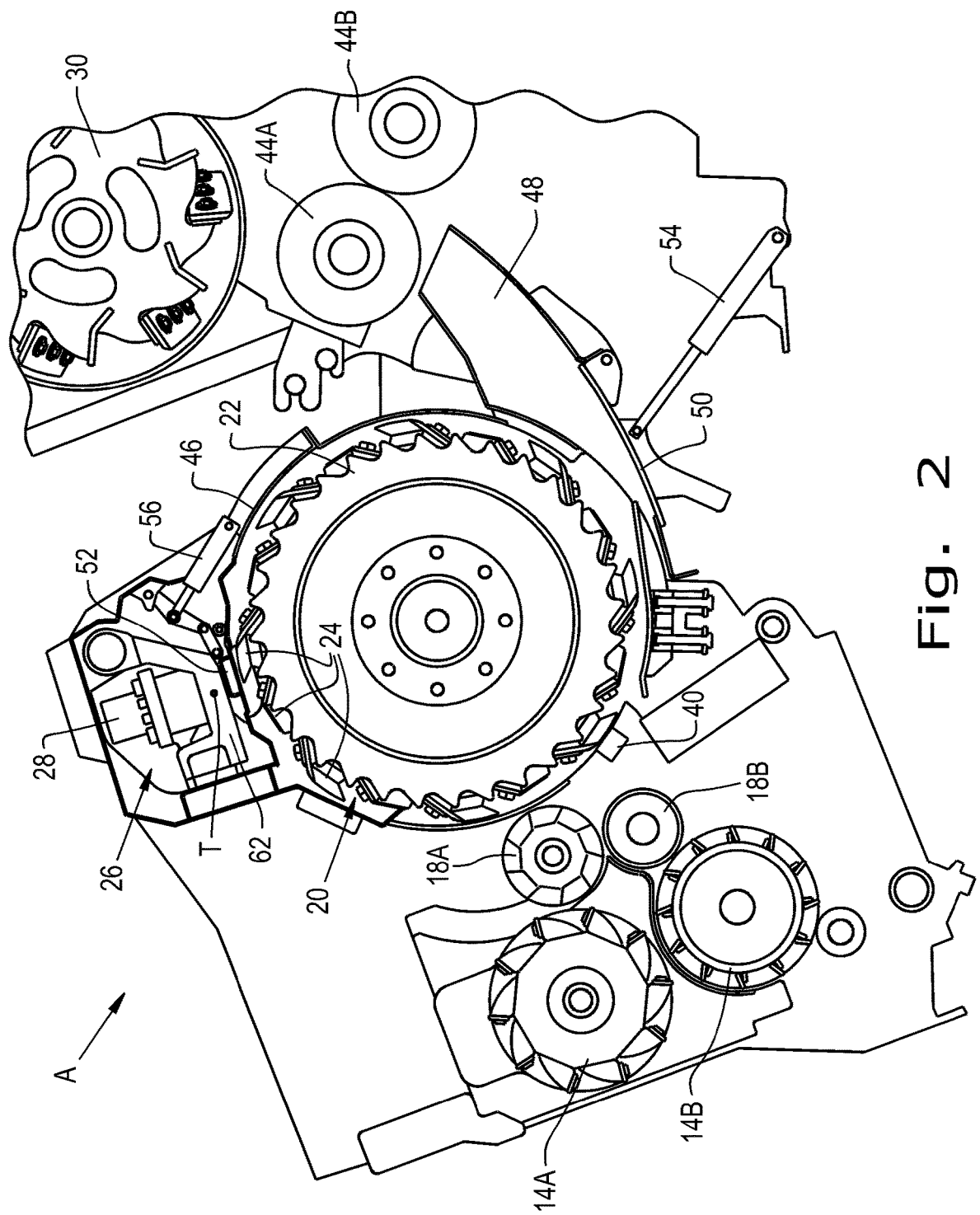
FIG. 2 is an enlargement of the region labeled "A" in FIG. 1 showing the forage harvester with a closed transition door and a closed sharpening door.

Referring now to the drawings, and more particularly to FIGS. 1-2, there is shown an agricultural vehicle 10 in the form of a forage harvester which includes a frame 12, a pair of front feed rolls 14A, 14B carried by the frame 12 adjacent a front 16 of the harvester 10, a pair of rear feed rolls 18A, 18B behind the front feed rolls 14A, 14B, a cutter head 20 including a cutter drum 22 which rotates a plurality of cutting knives 24, and a sharpening system 26 including a sharpening stone 28. While the agricultural vehicle 10 is shown in the form of a forage harvester, it should be appreciated that the present invention is not limited to implementation in forage harvesters, and can be applied to other agricultural vehicles which include knives such as combine harvesters and mowers. The forage harvester 10 is shown carrying a corn header at the front 16 of the harvester 10, but it should be appreciated that the harvester 10 can be equipped with other types of headers, such as a pick-up header, or cutting element(s). The forage harvester 10 can also include an accelerator 30 which rotates to send cut crop material out of a discharge spout 32 and an operator cabin 34 where an operator may control actions of the harvester 10. The operator cabin 34 may include, for example, a controller 36 operably coupled to a display 38, which can be a touchscreen, the operator can utilize to control various operation functions of the harvester 10. The controller 36 may be, for example, an electronic processing circuit including a central processing unit and a memory which is operatively coupled to components of the cutter head 20 and sharpening system 26 and configured to control various functions thereof, which shall be described further herein. It should be appreciated that the aforementioned elements of the harvester 10 may be of any suitable construction for performing their respective functions without deviating from the scope of the present invention.

Referring now to FIG. 2, an enlarged view of the region labeled "A" in FIG. 1 is shown to better illustrate aspects of the present invention. As can be seen, the cutting knives 24, when rotating, cooperate with a shear bar 40 to cut crop material directed toward the cutter head 20 by the rear feed rolls 18A, 18B. The shear bar 40 can be adjustable to adjust the relative positioning of the shear bar 40 with respect to the cutter head 20, as is known. The forage harvester 10 can also include a pair of conditioning rollers 44A, 44B between the cutter head 20 and the accelerator 30 which receive cut crop material from the cutter head 20 and condition the crop material, in particular any kernels therein, before the crop material reaches the accelerator 30 for discharge.

The forage harvester 10 includes a housing 46 which houses the cutter head 20 and includes a transition channel 48 between the cutter head 20 and the accelerator 30 which, as shown in FIG. 2, has a transition door 50 associated therewith which is closed. Similarly, the housing 46 includes a sharpening door 52 between the cutter head 20 and the sharpening system 26, which is shown as closed in FIGS. 2-4 so that the sharpening stone 28 is shielded from the cutting knives 24 of the cutter head 20. The transition door 50 can be opened and closed by a respective transition actuator 54, such as a pneumatic or hydraulic cylinder, which is operatively coupled to the controller 36 and, similarly, the sharpening door 52 can be opened and closed by a respective sharpening door actuator 56, such as a pneumatic or hydraulic cylinder, which is operatively coupled to the controller 36. As shown, the sharpening system 26 and sharpening door 52 can be formed above the cutter head 20, so the sharpening stone 28 is moved from a "parked" position next to the top of the housing 46 to an operative position above the cutter head 20 by a sharpening stone wagon 62 which may be actuated by one or more actuators. For example, the sharpening stone 28 can be lowered to reach the cutting knives 24 from the parked position. The transition door 50 can be formed below the cutter head 20, the significance of which will be described further herein. When the sharpening door 52 is closed and the sharpening stone 28 is shielded from the cutting knives 24, the sharpening stone 28 should be out of the rotational path of the cutting knives 24 and should therefore not be able to grind down and sharpen the cutting knives 24 as the cutter drum 22 rotates. It should be appreciated that while the sharpening system 26 is described as moving the sharpening stone 28 with the sharpening stone wagon 62 toward the cutter drum 22 to grind and sharpen the cutting knives 24, it is also contemplated that the cutter drum 22 may be movable toward the sharpening stone 28 when the sharpening door 52 is open to grind and sharpen the cutting knives 24, and the present invention is equally applicable to either method of putting the cutting knives 24 in contact with the sharpening stone 28 for grinding.

In addition to the sharpening stone wagon 62 moving the sharpening stone 28 toward the cutter drum 22, i.e., lowering the sharpening stone 28, the sharpening stone wagon 62 may also move the sharpening stone 28 in a transverse direction T, shown as extending from the page in FIG. 2, which is parallel to an axis of rotation AR (shown in FIGS. 3-4) of the cutter drum 22. The sharpening stone wagon 62 may move the sharpening stone 28, for example, in the direction T along a travel path so the sharpening stone 28 can grind an entire width of each cutting knife 24 without being the same width as the cutting knives 24, reducing the weight of the relatively heavy sharpening stone 28 and reducing the number of sparks created during grinding. The sharpening stone wagon 62 may include or be linked to a rotary actuator which drives a transversely extending chain or belt connected to the sharpening stone 28. Alternatively, the sharpening stone wagon 62 may comprise a transverse hydraulic cylinder which is installed between the top of the housing 46 and the sharpening stone 28. The controller 36 may be configured, for example, to control actuators linked to the sharpening stone wagon 62 to move the sharpening stone 28 a predetermined number of passes, with each pass being defined by the sharpening stone 28 traveling along an entirety of the travel path, before further moving the sharpening stone 28 toward the cutter drum 22. The predetermined number of passes can be any desired number, as is known. For example, the controller 36 may be configured to cause the sharpening stone wagon 62 to carry the sharpening stone 28 along one pass before lowering the sharpening stone 28 toward the cutter drum 22. In this sense, the sharpening stone wagon 62 can carry the sharpening stone 28 so the sharpening stone 28 can grind the cutting knives 24 in a step-wise fashion. In one exemplary embodiment, the sharpening stone 28 can be mounted in a threaded ring which gets a slight downward rotation upon engaging a short cam that is installed at one end of the transverse travel path to automatically lower the sharpening stone 28 upon reaching the end of the travel path where the cam is located.

Figure 3:
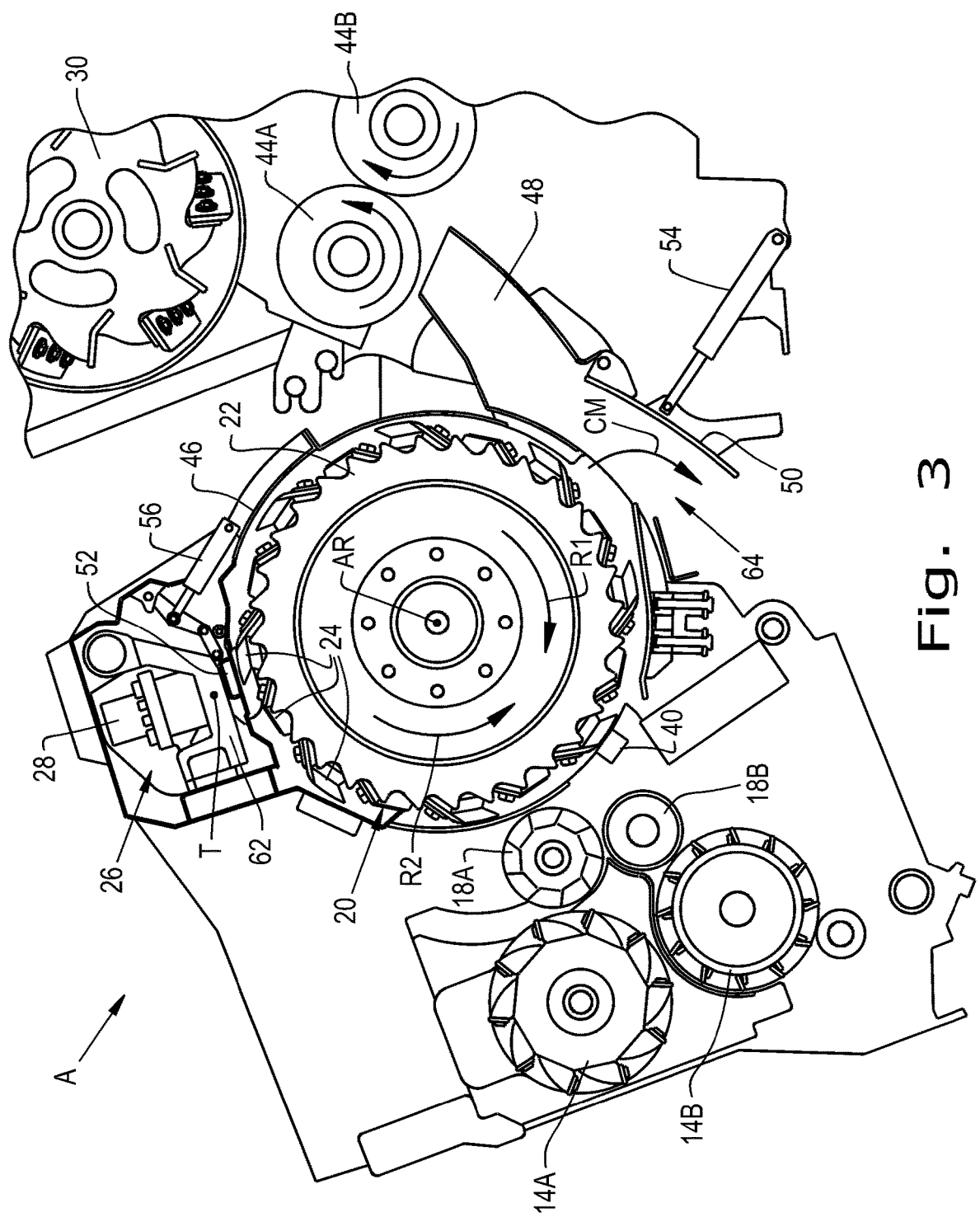
FIG. 3 is another enlargement of the region labeled "A" in FIGS. 1-2 showing the forage harvester with an open transition door and a closed sharpening door.
Figure 4:
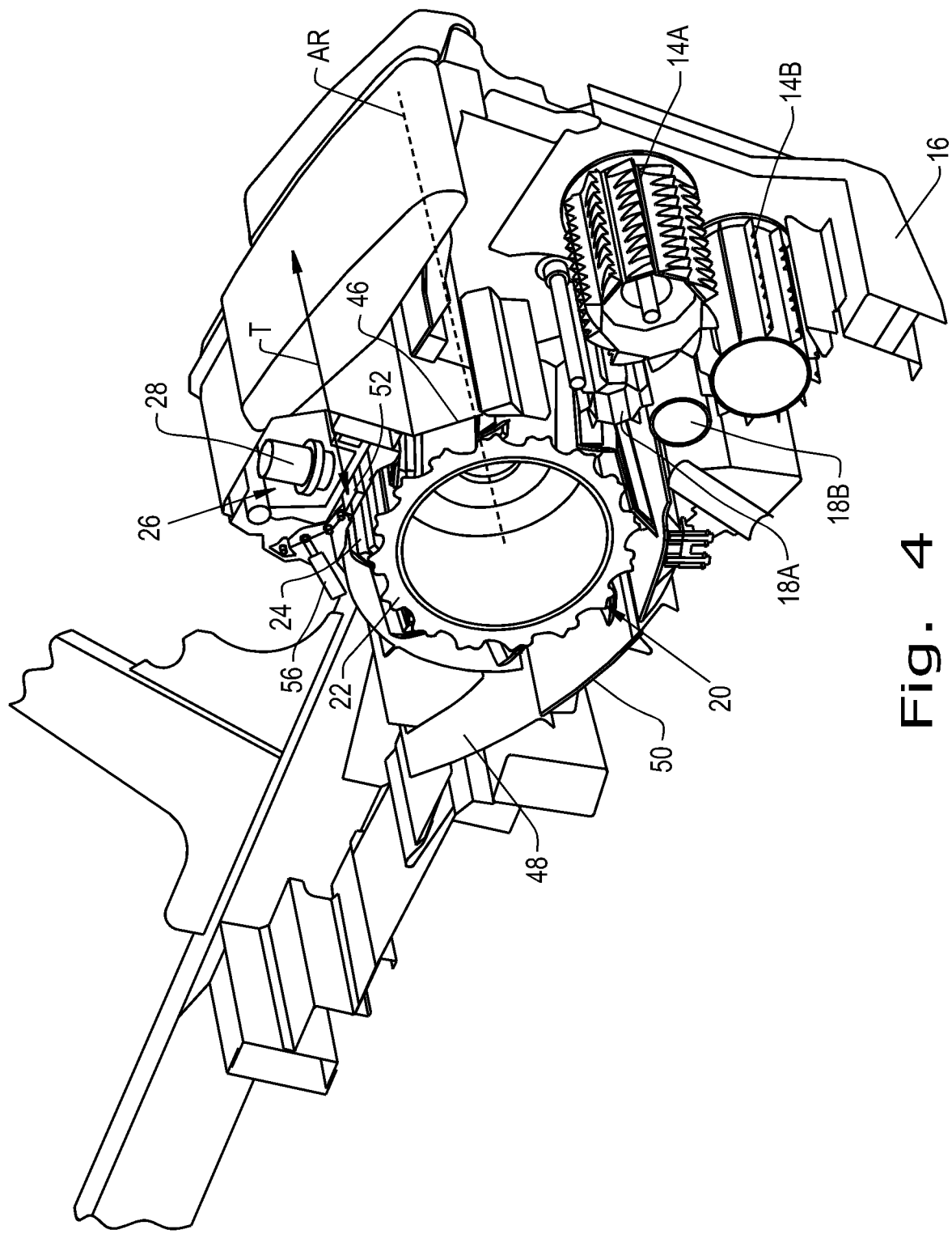
FIG. 4 is a sectional view of the forage harvester shown in FIGS. 1-3.

When a user wishes to sharpen the cutting knives 24 of the cutter head 20, the user can initiate a knife sharpening protocol implemented by the controller 36 to automatically sharpen the cutting knives 24. The user may initiate the knife sharpening protocol by, for example, selecting a proper icon on the display 38 in the cabin 34 to signal the controller 36 to initiate the knife sharpening protocol, similar to other functions of the harvester 10. The user may start the knife sharpening protocol while the cutter drum 22 is still rotating, e.g., during a short interruption in the harvesting process. While harvesting, the transition door 50 is normally closed and the sharpening door 52 is closed while the feed rolls 14A, 14B, 18A, 18B are rotated to convey crop material to the cutter drum 22. Once the knife sharpening protocol is initiated, the controller 36 can signal for the cutter drum 22 to begin rotating, if the cutter drum 22 is not already rotating, and determine whether the transition door 50 is open and the sharpening door 52 is closed. If, after the knife sharpening protocol is initiated, the transition door 50 is closed, as shown in FIG. 2, and/or the sharpening door 52 is open, the controller 36 can signal the respective door actuator 54, 56 to open the transition door 50 and/or close the sharpening door 52, respectively, so the transition door 50 is open and the sharpening door 52 is closed, as shown in FIG. 3. The user may also choose to stop rotation of the front feed rolls 14A, 14B and/or rear feed rolls 18A, 18B before initiating the knife sharpening protocol or, alternatively, the knife sharpening protocol may include the controller 36 stopping rotation of one or more feed rolls 14A, 14B, 18A, 18B.

When the sharpening door 52 is closed, the cutter drum 22 rotating creates an overpressure within the housing 46, in particular adjacent the trajectory of the cutting knives 24. If the transition door 50 is not open prior to the controller 36 signaling for the cutter drum 22 to rotate, the controller 36 can also signal for the transition door 50 to open after rotation of the cutter drum 22 begins. The overpressure created as the cutter drum 22 rotates while keeping the sharpening door 52 closed can pressurize crop material within the housing 46 so the pressurized crop material is biased toward an opening to relieve the built-up pressure. When the sharpening door 52 is closed and the transition door 50 is open, the open transition door 50 represents an opening 64 (shown in FIG. 3) in the housing 46 through which the pressurized crop material will discharge in order to relieve the built-up overpressure in the housing 46, with the flow of air and pressurized crop material being represented by arrow CM in FIG. 3. The rotation of the cutting drum 22 in the knife sharpening protocol can be for a predetermined amount of time, such as one to three minutes, at a predetermined RPM of the cutter drum 22, with it to be understood that both the rotation time and speed can be varied as desired.

Figure 5:
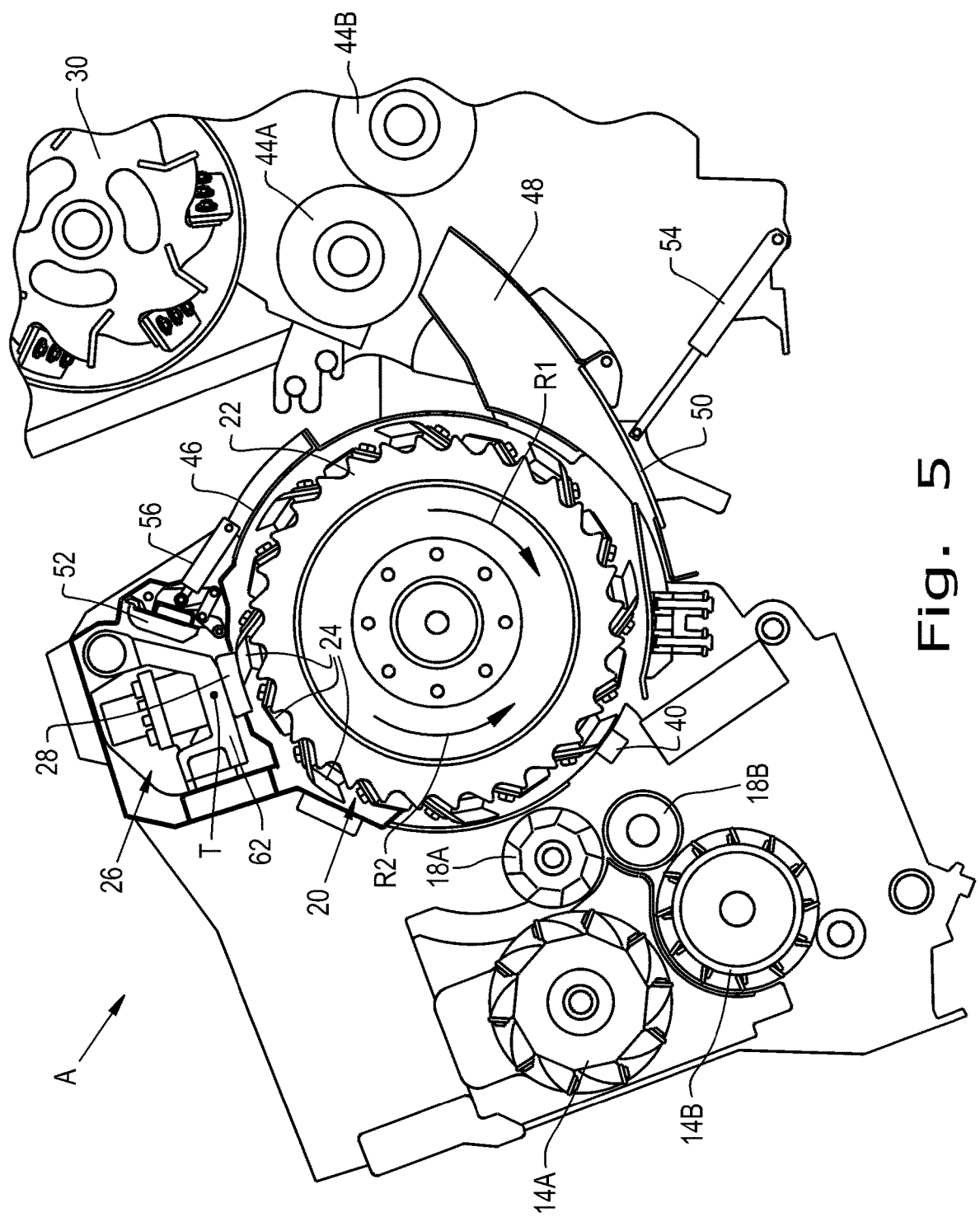
FIG. 5 is yet another enlargement of the region labeled "A" in FIGS. 1-3 showing the forage harvester with an open sharpening door and a closed transition door.

After the predetermined amount of time of the cutter drum 22 rotating and keeping the transition door 50 open, the sharpening door 52 can be opened and the transition door 50 can be closed by activating the respective actuators 54, 56, as shown in FIG. 5. It should be appreciated that the sharpening door 52 can open before closing the transition door 50, the transition door 50 can be closed simultaneously with the sharpening door 52 opening, or the sharpening door 52 can open after closing the transition door 50. When the sharpening door 52 is opened, the cutting knives 24 are exposed to the sharpening stone 28 so the sharpening stone 28 and cutting knives 24 can be brought together, allowing the sharpening stone 28 to grind the cutting knives 24 during rotation of the cutter drum 22. Optionally, the sharpening stone 28 may also rotate during grinding. As previously described, the sharpening stone 28 can be lowered toward the cutter drum 22 and cutting knives 24 and moved along a travel path in passes by the sharpening stone wagon 62. The cutter drum 22 can rotate in either a first direction R1 or a second direction R2 during the grinding at any desired rotational speed to grind the cutting knives 24 with the sharpening stone 28. Due to ejection of crop material through the opening 64 by the overpressure which is created during the rotation of the cutter drum 22 while the sharpening door 52 is closed and the transition door 50 is open, crop material accumulation in the housing 46 can be reduced, if not eliminated, prior to grinding of the cutting knives 24 with the sharpening stone 28, reducing the risk of a thermal incident caused by sparks produced during the grinding and also reducing the risk of crop material and debris jamming movement of the sharpening stone wagon 62 when the sharpening door 52 is opened. Upon completion of grinding the cutting knives 24 with the sharpening stone 28, the sharpening stone 28 can be raised and/or moved back to the parked position outside of the housing 46 and the sharpening door 52 can be closed, shielding the sharpening stone 28 from the cutting knives 24 once again so the harvester 10 can begin cutting crop material with sharpened cutting knives 24. Optionally, a position of the shear bar 40 can be adjusted after the knife sharpening protocol, as desired and in accordance with known methods in order to minimize the clearance between the cutting knives 24 and the adjacent edge of the shear bar 40.

Referring now to FIG. 6, a flow chart illustrating a method 100 for sharpening cutting knives 24 carried by a cutter drum 22 in a housing 46 of an agricultural vehicle 10 according to an exemplary embodiment of the present invention is shown. The method 100 includes initiating S102 a knife sharpening protocol. The knife sharpening protocol includes rotating S104 the cutter drum while keeping the sharpening door 52 closed so an overpressure is created inside the housing 46, the sharpening door 52 closing the top of the housing 46 and shielding the sharpening stone 28 from the cutting knives 24 while creating the overpressure. The transition door 50 of the housing 46 below the cutter drum 22 is opened S106 to eject crop material through the open transition door 64. It should be appreciated that rotating S104 the cutter drum 22 can begin before opening S106 the transition door 50 to allow the overpressure to build before ejecting crop material through the open transition door 64, or the transition door 52 can be opened S106 before rotating S104 the cutter drum 22. Then, the sharpening door 52 is opened S108 to expose the cutting knives 24 to the sharpening stone 28 and the transition door 50 is closed S108. The sharpening stone 28 grinds S110 the cutting knives 24 and the sharpening door 52 is once again closed S112 to shield the sharpening stone 28 from the cutting knives 24 after grinding. The grinding S110 can include lowering the sharpening stone 28 toward the cutter drum 22 and/or moving the sharpening stone 28 along a travel path which is parallel to the axis of rotation AR of the cutter drum 22. Moving the sharpening stone 28 along the travel path can occur in a series of passes, with each pass being defined by the sharpening stone 28 moving along an entirety of the travel path and the sharpening stone 28 lowering toward the cutter drum 22 after a predetermined number of passes. The sharpening stone 28 can be raised outside of the housing 46 and/or parked next to the housing 46 prior to closing S112 the sharpening door 52. During grinding S110, the cutter drum 22 may continue to rotate, with the cutter drum 22 rotating in the first direction R1 or the second direction R2 during grinding S110. After grinding S110, a position of the shear bar 40 may be adjusted S114. It should be appreciated that the agricultural vehicle 10 in the form of a forage harvester may be configured to perform the method 100, and the method 100 can be implemented by a controller 36 of the vehicle 10. The knife sharpening protocol may be initiated S102, for example, by selecting a corresponding icon on a display 38 operatively coupled to the controller 36 or pushing a dedicated button on a console next to the operator seat.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for sharpening cutting knives carried by a cutter drum in a housing of an agricultural vehicle, comprising:
    rotating the cutter drum while keeping a sharpening door closed so an overpressure is created inside the housing, the sharpening door shielding a sharpening stone from the cutting knives while creating the overpressure;
    opening a transition door of the housing below the cutter drum to eject crop material through the open transition door;
    opening the sharpening door to expose the cutting knives to the sharpening stone and closing the transition door;
    grinding one or more of the cutting knives with the exposed sharpening stone; and
    closing the sharpening door to shield the sharpening stone from the cutting knives after the grinding.
2. The method of claim 1, wherein the sharpening door is above the cutter drum.
3. The method of claim 2, wherein the grinding includes lowering the sharpening stone toward the cutter drum.
4. The method of claim 3, wherein the sharpening stone is moved outside of the housing prior to closing the sharpening door.
5. The method of claim 2, wherein the grinding includes moving the sharpening stone along a travel path which is parallel to an axis of rotation of the cutter drum.
6. The method of claim 5, wherein the moving of the sharpening stone along the travel path occurs in a series of passes, each pass being defined by the sharpening stone moving along an entirety of the travel path, the sharpening stone lowering toward the cutter drum after a predetermined number of passes.
7. The method of claim 1, wherein the cutter drum continues rotating during grinding by the sharpening stone.
8. The method of claim 1, further comprising adjusting a position of a shear bar after the closing.
9. The method of claim 1, further comprising stopping rotation of at least one feed roll directing material toward the cutter drum prior to opening the transition door.
10. An agricultural vehicle comprising:
    a housing comprising a transition door;
    a cutter drum carrying cutting knives in the housing, wherein the transition door is below the cutter drum;
    a sharpening stone;
    a sharpening door shielding the sharpening stone; and
    a controller configured for performing steps of:
        rotating the cutter drum while keeping the sharpening door closed so an overpressure is created inside the housing, the sharpening door shielding the sharpening stone from the cutting knives while creating the overpressure;
        opening the transition door to eject crop material through the open transition door;
        opening the sharpening door to expose the cutting knives to the sharpening stone and closing the transition door;
        grinding one or more of the cutting knives with the exposed sharpening stone; and
        closing the sharpening door to shield the sharpening stone from the cutting knives after the grinding.
11. The agricultural vehicle of claim 10, wherein the agricultural vehicle is a forage harvester.
12. The agricultural vehicle of claim 10, further comprising a display operatively coupled to the controller, wherein the steps of the controller are initiated by selecting a corresponding icon on the display.

* * * * *